Oct. 5, 1948.   G. J. THOMPSON ET AL   2,450,458
EXPANSION COUPLING

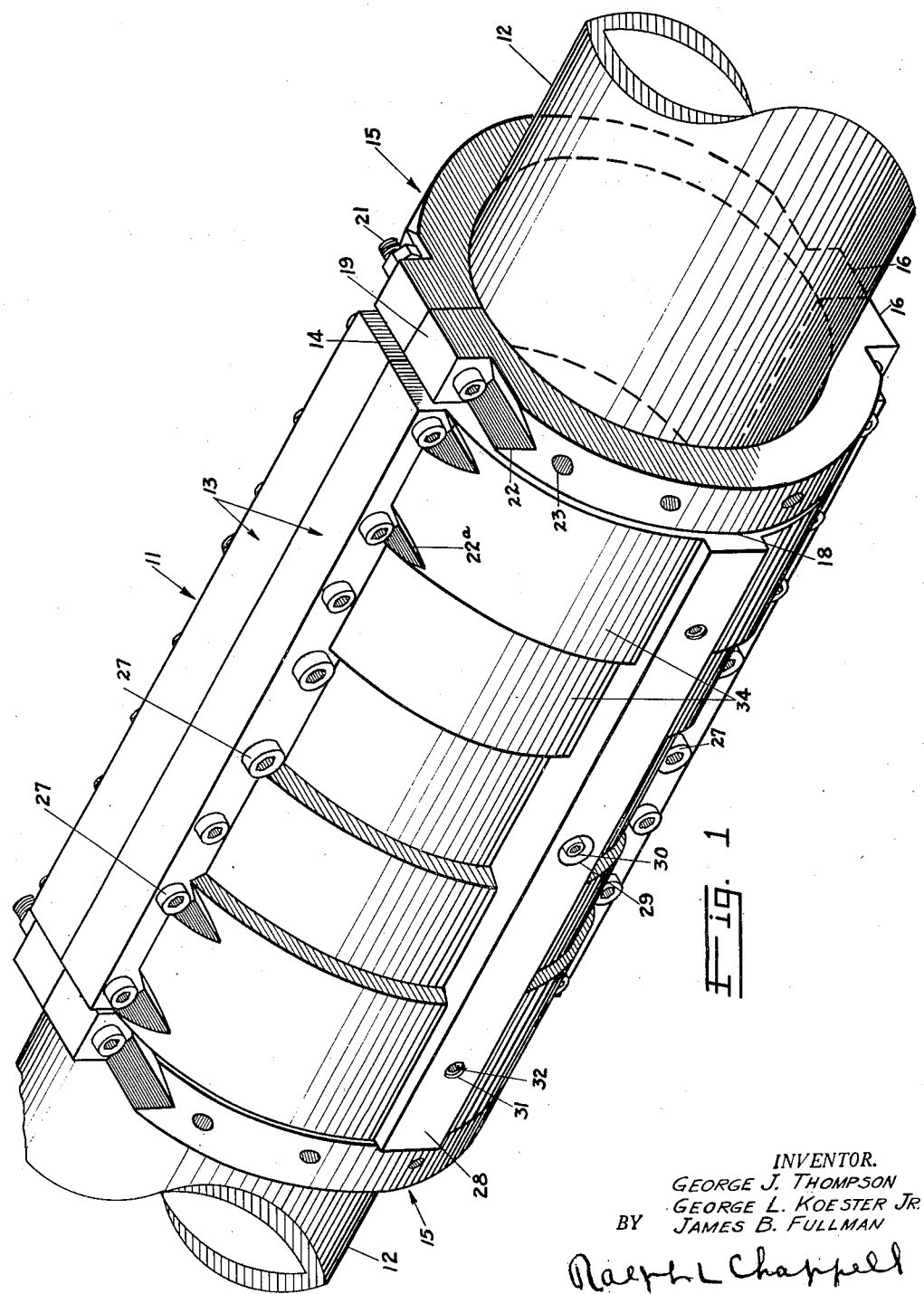

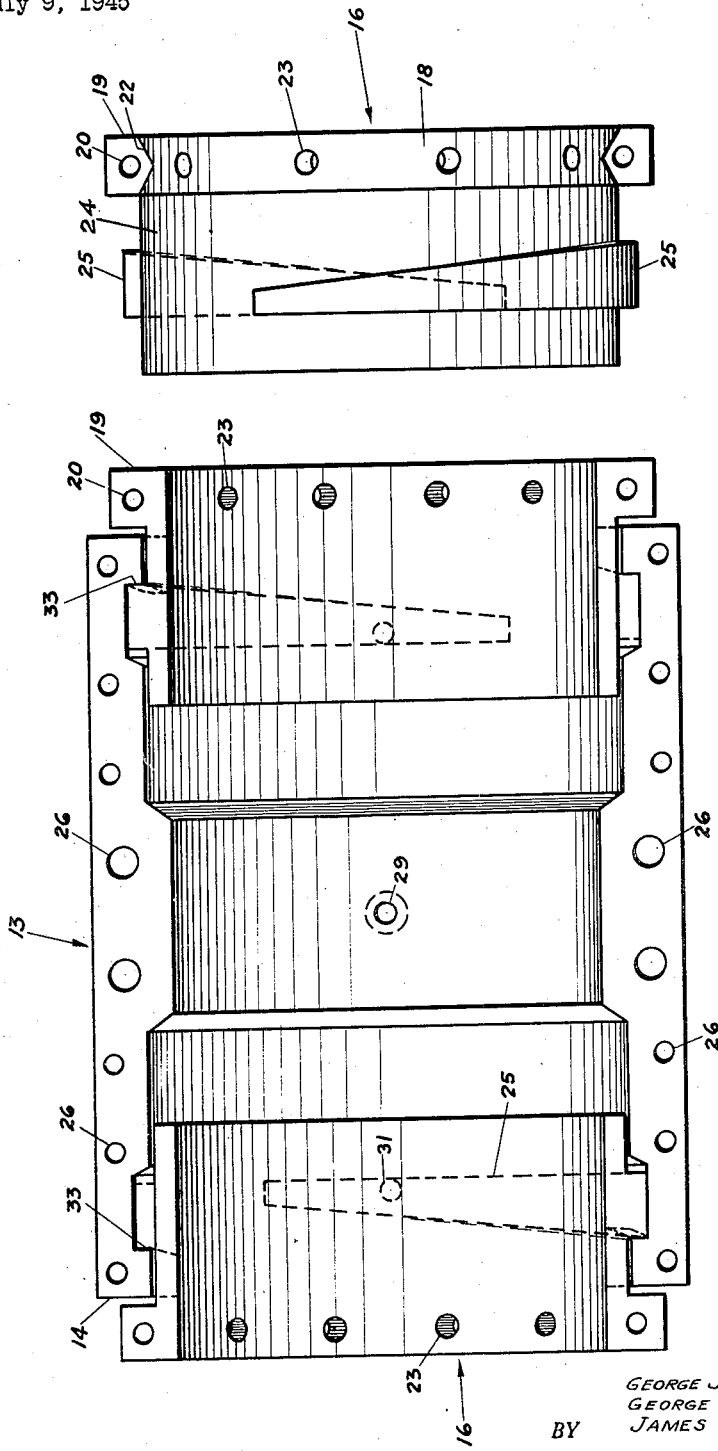

Filed July 9, 1945   3 Sheets-Sheet 3

INVENTOR.
GEORGE J. THOMPSON
GEORGE L. KOESTER JR.
BY   JAMES B. FULLMAN

Ralph L. Chappell
ATTORNEY.

Patented Oct. 5, 1948

2,450,458

UNITED STATES PATENT OFFICE 2,450,458

EXPANSION COUPLING

George J. Thompson, George L. Koester, Jr., and James B. Fullman, United States Navy Application July 9, 1945, Serial No. 604,005

6 Claims. (Cl. 285—162)

(Granted under the act of March 3, 1883, as amended April 30, 1928; 370 O. G. 757)

This invention relates in general to couplings and in particular to a split-type expansion coupling.

In many installations pipe or other similar protective covering is used in connection with electric wire and cable. For example, on board ships it is customary to provide degaussing equipment comprising a substantially continuous electric conductor surrounding the ship. Inasmuch as this conductor is sometimes exposed to the weather, it is essential to provide a suitable weatherproof protection against water and corrosion. Also, inasmuch as this equipment undergoes constant vibration due to the motion of the ship and is sometimes constantly exposed to the corrosive action of sea water, it is advisable to supply readily repairable or replaceable parts in association therewith.

It is an object of this invention to provide a coupling that is capable of being readily removed and replaced.

It is another object to provide an expansion coupling that is capable of being readily removed and replaced.

It is another object to provide a coupling that connects two sections of pipe surrounding a substantially continuous member and that can be removed therefrom without removal, severing or destruction of the continuous member.

It is another object to provide degaussing equipment for shipboard use comprising substantially continuous cable contained in a plurality of pipes, said pipes being joined together by readily removable couplings.

Further objects and advantages of this invention, as well as its construction, arrangement and operation, will be apparent from the following description and claims in connection with the accompanying drawings, in which:

Fig. 1 is an isometric view of the coupling according to this invention.

Fig. 2 is an internal front view of one half of the coupling.

Fig. 3 is an external front view of a gland unit of the coupling.

Figure 4:
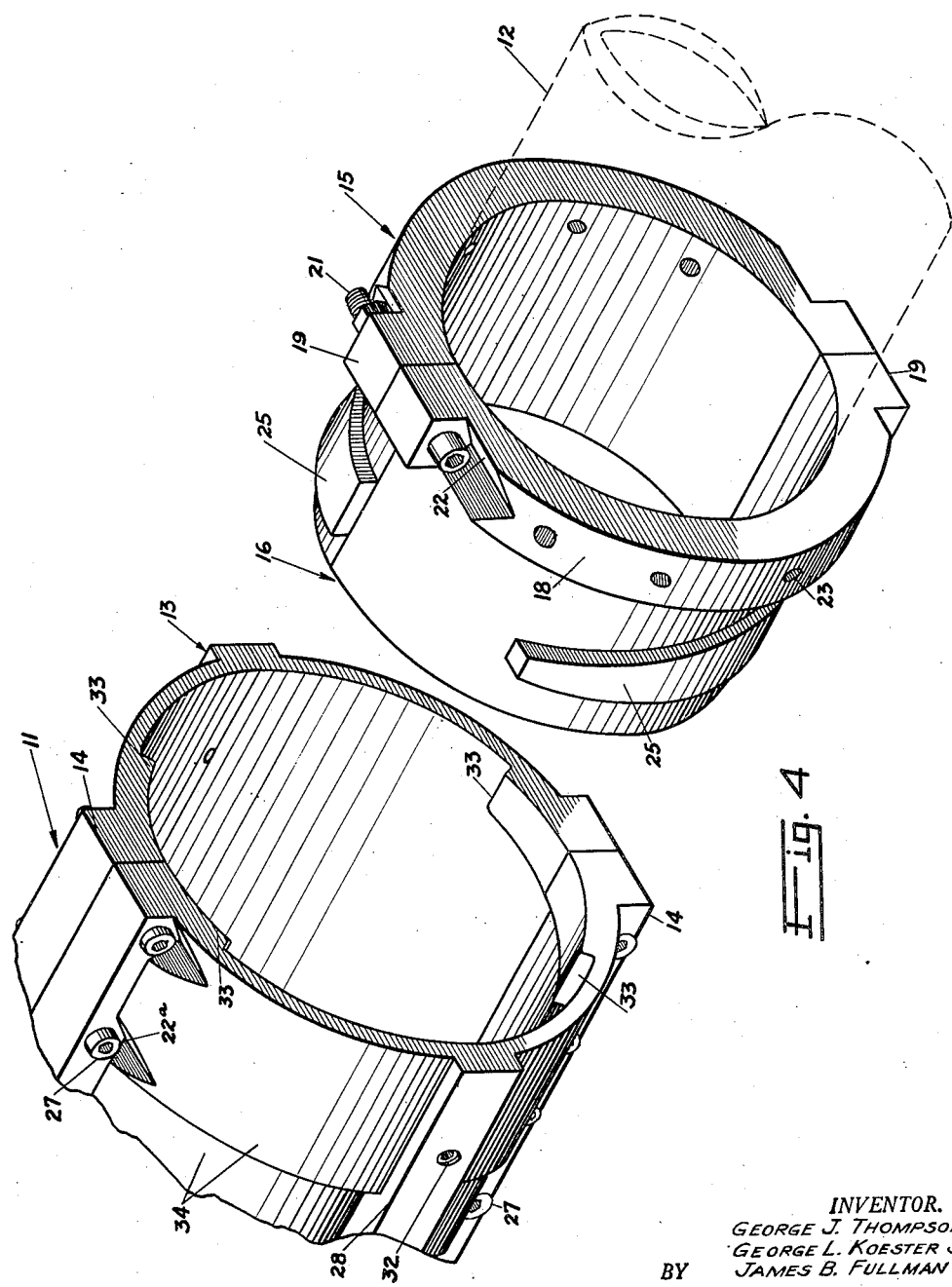
Fig. 4 is an exploded view of parts at one end of the coupling.

Fig. 1 shows a split expansion coupling generally designated 11 and two sections of pipe 12 connected thereby. The coupling comprises a longitudinally split shell of two longitudinal coupling sections generally designated 13 and two longitudinally split glands generally designated 15, each gland 15 comprising two gland sections 16. The pipe 12 is adapted to house an electric cable or other substantially continuous member (not shown).

Each gland 15 (Figs. 1 and 3) has an internal diameter slightly greater than the external diameter of pipe 12, and each gland section 16 is provided with a raised rim 18 and a raised flange 19 on said rim adjacent the edge of said section, said flange 19 being provided with a hole 20 (see Fig. 3) adapted to receive a nut and bolt assembly 21 (see Fig. 1) whereby the two sections 16 are bolted together. The rim 18 is provided with a recess 22 adjacent the flange 19 to permit easy access to the nut and bolt assembly 21. There are also provided holes 23 to receive a spanner wrench and permit turning of the gland assembly 15. Adjacent to the rim and integrally attached thereto is the half-shell 24 of the gland section 16 having on its surface a wedge-shaped raised projection 25, the direction of the taper in said wedge-shaped projection 25 being such that it is adapted to act as a right-hand thread.

The body of the coupling comprises two longitudinal sections 13, each section being graduated in several stages or strata 34 from the end, where the internal diameter is sufficient to provide a small clearance between the outer surface of the gland 15 and the inner surface of the coupling, to the center, where there is little more than a nominal clearance to allow for irregularities in the surfaces. There is a raised flange 14 along each edge of said section 13, the flange 14 being drilled with holes 26 (see Fig. 2) to accommodate nut and bolt assemblies 27 (see Fig. 1), with adjacent recesses 22a to allow easy access to assemblies.

Along the side of said section 13 there is a raised strip 28 for the dual purpose of reenforcing the structure and providing a space to accomodate hole 29 (see also Fig. 2), for centering screw 30 and holes 31 (see also Fig. 2) for screws 32. The centering setscrew 30 is located substantially in the center of strip 28 and the setscrews 32 are somewhat nearer the end of said strip and are so positioned that in the completed assembly each setscrew impinges on the surface of the gland shell 24 or on the wedge-shaped projection 25 located on the surface of gland shell 24. On the inner surface of section 13 and adjacent to the end thereof is a wedged-shaped projection 33 (see Fig. 2) which has substantially the same taper to its wedge as raised projection 25 on the gland portion 16, thereby being adapted to coact with said projection 25 in the formation of the screw attachment. As shown in Fig. 4, a portion of each wedge-shaped projection 33 is formed on one of coupling sections 13 and a portion is formed on the other coupling section 13. In assembled relation the portions of each wedge-shaped projection 33 complement each other to form a continuous projection.

In assembling (Fig. 4) the shell of the coupling 11 is formed by tightly bolting together the two longitudinal sections 13 to form an envelope around the sections of pipe 12 to be joined together. There can optionally be used conventional gaskets or sealing materials (not shown) between the adjacent surfaces of said sections 13. This assembly is slid along the pipe 12 until it is directly centered over the joint between the two sections of pipe and the centering screw 30 (see Fig. 1) is tightened to project into said joint, thus maintaining the proper centering of the assembly.

The gland portion 15 is then assembled by tightly bolting together the two longitudinal sections 16 by means of bolts and nut assemblies 21 around pipe 12 with the raised rim 18 away from the coupling sections 13. Suitable gaskets or sealing material (not shown) can be used between the facing surfaces of gland assembly 15. The gland assembly 15 is then slid into coupling sections 13 with or without the use of a gasket of packing material (not shown) and is tightened as a right-hand screw by means of a spanner wrench fitting in holes 23. The coaction between tapered projections 25 on the gland sections 16 and tapered projections 33 on the coupling sections 13 is shown in Fig. 2 and the tightening effect obtained by a right-hand twisting motion is apparent.

To complete the assembly of the coupling, the gland portion 15 is firmly screwed into the coupling sections 13 and the packing (if used) is thereby compressed. Screwing of gland 15 into coupling sections 13 insures longitudinal alignment of coupling sections 13 because of the wedging action of gland projection 25 against the complementary portions of wedge-shaped projection 33. Setscrews 32 are tightened against the gland portions 15 holding it firmly in place. In the same manner, the gland at the other end of the coupling is assembled and tightened into place. There is thus provided a firm expansion coupling between the two sections of pipe, and if packing or gaskets be used there results a liquid-tight or gas-tight coupling.

The coupling can be used in any installation where it is desired to have a coupling that can be removed without displacing the pipes which are connected thereby and without breaking or cutting into the contents of said pipes. Among the applications are all types of electrical conductors contained in a protective-type covering. The coupling can be used in closely joined liquid-carrying pipes where it is desired to replace the coupling without interrupting the flow of the liquid therein. The invention also finds application where it is desired to connect solid wires or posts, for example, for structural purposes and where it is desired to change the coupling between such wires or posts without changing their relative positions.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An expansion coupling comprising a pair of mating longitudinal coupling sections, a gland at one end of said coupling adapted to fit within said coupling sections, said gland comprising a pair of mating gland sections, a wedge-shaped projection formed externally on said gland, a wedge-shaped projection formed internally on said coupling sections with a portion of said projection formed on one of said mating coupling sections and a portion of said projection formed on the other of said coupling sections so that when the longitudinal coupling sections are in assembled relation said portions complement each other to form a single continuous projection, said gland projection being arranged for screwing action relative to said coupling projection to effect longitudinal alignment of said mating longitudinal coupling sections.

2. An expansion coupling for interconnecting a pair of aligned elements, said expansion coupling comprising a pair of mating longitudinal coupling sections adapted to fit over the joint between the elements, and a retractable locating member adapted to project inwardly from one of said mating longitudinal coupling sections into the joint between the elements to locate the coupling relative to the elements and adapted for retraction to permit longitudinal sliding of the coupling relative to the elements.

3. An expansion coupling for interconnecting a pair of aligned elements, said expansion coupling comprising a pair of mating longitudinal coupling sections, a gland at one end of said coupling adapted to fit within said coupling sections, said gland comprising a pair of mating gland sections, a wedge-shaped projection formed externally on said gland, a wedge-shaped projection formed internally on said coupling sections with a portion of said projection formed on one of said mating coupling sections and a portion of said projection formed on the other of said coupling sections so that when the longitudinal coupling sections are in assembled relation said portions complement each other to form a single continuous projection, said gland projection being arranged for screwing action relative to said coupling projection to effect longitudinal alignment of said mating longitudinal coupling sections, and a retractable locating member adapted to project inwardly from one of said mating longitudinal coupling sections into the joint between the elements to locate the coupling relative to the elements and adaped for retraction to permit longitudinal sliding of the coupling relative to the elements.

4. An expansion coupling comprising a pair of mating longitudinal coupling sections, a gland at one end of said coupling adapted to fit within said coupling sections, a wedge-shaped projection formed externally on said gland, a wedge-shaped projection formed internally on said coupling sections with a portion of said projection formed on one of said mating coupling sections and a portion of said projection formed on the other of said coupling sections.

5. An expansion coupling for interconnecting a pair of aligned elements, said expansion coupling comprising a pair of mating longitudinal coupling sections, a gland at one end of said coupling adapted to fit within said coupling sections, a wedge-shaped projection formed externally on said gland, a wedge-shaped projection formed internally on said coupling sections with a portion of said projection formed on one of said mating coupling sections and a portion of said projection formed on the other of said sections, and a retractable locating member adapted to project inwardly from one of said mating longitudinal coupling sections into the joint between the elements to locate the coupling relative to the elements and adapted for retraction to permit longitudinal sliding of the coupling relative to the elements.

6. An expansion coupling comprising a first pair of mating longitudinal coupling sections, a second pair of mating longitudinal coupling sections, an end of one of the pairs of sections being adapted to fit within an end of the other of the pairs of sections, separate wedge-shaped projections formed one at each of the fitted ends of the pairs of sections, said projections being adapted for screwing engagement, at least one of said projections being formed partly on one of the sections and partly on the other of the sections in the pair.

GEORGE J. THOMPSON.
GEORGE L. KOESTER, JR.
JAMES B. FULLMAN.

REFERENCES CITED

The following references are of record in the file of this patent:

UNITED STATES PATENTS

| Number | Name | Date |
|---|---|---|
| 935,111 | Jones | Sept. 28, 1909 |
| 1,081,226 | Forst | Dec. 9, 1913 |
| 1,286,388 | Mulconroy | Dec. 3, 1918 |
| 1,823,234 | Bell | Sept. 15, 1931 |
| 1,995,042 | Powers | Mar. 19, 1935 |